US008799242B2

(12) United States Patent
Leonard et al.

(10) Patent No.: US 8,799,242 B2
(45) Date of Patent: Aug. 5, 2014

(54) DISTRIBUTED SCALABLE POLICY BASED CONTENT MANAGEMENT

(75) Inventors: Glenda Ann Leonard, Ottawa (CA); Thane Eisener, Kanata (CA); Julian Craddock, Maderia Park (CA); Waldo Rochow, Cummberland (CA); Paul Haskins, Manotick (CA)

(73) Assignee: TrueContext Corporation, Kanata, Ontario (CA)

( * ) Notice: Subject to any disclaimer, the term of this patent is extended or adjusted under 35 U.S.C. 154(b) by 1465 days.

(21) Appl. No.: 10/961,784

(22) Filed: Oct. 8, 2004

(65) Prior Publication Data

US 2006/0089938 A1 Apr. 27, 2006

(51) Int. Cl.
*G06F 17/30* (2006.01)

(52) U.S. Cl.
USPC .......................................................... 707/694

(58) Field of Classification Search
USPC ............................... 709/220, 222, 203; 707/9
See application file for complete search history.

(56) References Cited

U.S. PATENT DOCUMENTS

| 5,054,095 | A | 10/1991 | Bernsen et al. | 382/30 |
|---|---|---|---|---|
| 5,054,096 | A | 10/1991 | Beizer | 382/41 |
| 5,513,332 | A | 4/1996 | Wimer et al. | |
| 5,664,207 | A | 9/1997 | Crumpler et al. | |
| 5,675,743 | A | 10/1997 | Mavity | |
| 5,680,548 | A | 10/1997 | Trugman | |
| 5,801,689 | A | 9/1998 | Huntsman | |
| 5,812,857 | A | 9/1998 | Nelson et al. | |
| 5,819,274 | A | 10/1998 | Jackson, Jr. | |
| 5,884,317 | A | 3/1999 | Cline et al. | |
| 5,887,141 | A | 3/1999 | Trugman | |
| 5,926,637 | A | 7/1999 | Cline et al. | |
| 5,937,198 | A | 8/1999 | Nelson et al. | |
| 5,949,412 | A | 9/1999 | Huntsman | |
| 5,960,421 | A | 9/1999 | Cline et al. | |
| 6,006,229 | A | 12/1999 | Schmidt et al. | |
| 6,006,277 | A | 12/1999 | Talati et al. | |

(Continued)

FOREIGN PATENT DOCUMENTS

| WO | WO 97/43717 | 11/1997 | .............. G06F 13/00 |
|---|---|---|---|
| WO | WO 01/52496 | 7/2001 | |

OTHER PUBLICATIONS

Montanari Rebecca; Emil Lupu; Cesare Stefanelli; "Policy-Based Dynamic Reconfiguration of Mobile-Code Applications", Jul. 2004, IEEE Computer Society, p. 73-80.*

(Continued)

*Primary Examiner* — Dinku Gebresenbet
(74) *Attorney, Agent, or Firm* — Nixon Peabody LLP

(57) ABSTRACT

A method for defining and constraining the behavior of a shared, mobile content management system is disclosed. The method includes providing an admin console for defining, modifying, and managing declarative policies. Declarative policies are defined based on an XML policy model. The XML policy model dictates the policies that can be expressed by the admin console. The defined declarative policies are enacted without requiring the content management system to be restarted, reconfigured, or re-implemented. An XML-based policy wizard definition language is provided to define policy wizards in the admin console that guide an administrator through the steps of creating and editing the policies. Additionally, at least one policy repository based on LDAP is provided. The at least one policy repository has an interface and is adapted to store a plurality of declarative policies. The policy repository has scalable and distributed capabilities.

24 Claims, 10 Drawing Sheets

(56) References Cited

U.S. PATENT DOCUMENTS

| | | | |
|---|---|---|---|
| 6,070,199 | A | 5/2000 | Axtman et al. |
| 6,115,744 | A | 9/2000 | Robins et al. |
| 6,119,167 | A | 9/2000 | Boyle et al. |
| 6,128,742 | A | 10/2000 | Felt |
| 6,216,151 | B1 | 4/2001 | Antoun |
| 6,230,190 | B1 | 5/2001 | Edmonds et al. |
| 6,233,608 | B1 | 5/2001 | Laursen et al. |
| 6,236,999 | B1 | 5/2001 | Jacobs et al. |
| 6,243,676 | B1 | 6/2001 | Witteman |
| 6,247,048 | B1 | 6/2001 | Greer et al. |
| 6,253,257 | B1 | 6/2001 | Dundon |
| 6,288,718 | B1 | 9/2001 | Laursen et al. |
| 6,289,212 | B1 | 9/2001 | Stein et al. |
| 6,292,657 | B1 | 9/2001 | Laursen et al. |
| 6,292,833 | B1 | 9/2001 | Liao et al. |
| 6,301,471 | B1 | 10/2001 | Dahm et al. |
| 6,301,474 | B1 | 10/2001 | Hartmaier et al. |
| 6,304,746 | B1 | 10/2001 | Fascenda et al. |
| 6,304,753 | B1 | 10/2001 | Hartmaier |
| 6,304,881 | B1 | 10/2001 | Halim et al. |
| 6,314,108 | B1 | 11/2001 | Ramasubramani et al. |
| 6,317,594 | B1 | 11/2001 | Gossman et al. |
| 6,317,831 | B1 | 11/2001 | King |
| 6,330,568 | B1 | 12/2001 | Boothby et al. |
| 6,341,270 | B1 | 1/2002 | Esposito et al. |
| 6,341,316 | B1 | 1/2002 | Kloba et al. |
| 6,347,095 | B1 | 2/2002 | Tang et al. |
| 6,353,839 | B1 | 3/2002 | King et al. |
| 6,356,964 | B1 | 3/2002 | Mohindra et al. |
| 6,360,252 | B1 | 3/2002 | Rudy et al. |
| 6,360,279 | B1 | 3/2002 | Woods et al. |
| 6,363,419 | B1 | 3/2002 | Martin, Jr. et al. |
| 6,370,518 | B1 | 4/2002 | Payne et al. |
| 6,385,643 | B1 | 5/2002 | Jacobs et al. |
| 6,393,269 | B1 | 5/2002 | Hartmaier et al. |
| 6,397,345 | B1 | 5/2002 | Edmonds et al. |
| 6,400,754 | B2 | 6/2002 | Fleming et al. |
| 6,405,037 | B1 | 6/2002 | Rossmann |
| 6,463,470 | B1* | 10/2002 | Mohaban et al. ............ 709/223 |
| 6,539,425 | B1* | 3/2003 | Stevens et al. ............... 709/220 |
| 6,647,388 | B2* | 11/2003 | Numao et al. ..................... 707/9 |
| 2001/0041556 | A1 | 11/2001 | Laursen et al. |
| 2001/0051979 | A1 | 12/2001 | Aufricht et al. |
| 2002/0016813 | A1 | 2/2002 | Woods et al. |
| 2002/0023173 | A1 | 2/2002 | Jacobs et al. |
| 2002/0032722 | A1 | 3/2002 | Baynes, Jr. et al. |
| 2002/0032750 | A1 | 3/2002 | Kanefsky |
| 2002/0035605 | A1 | 3/2002 | McDowell et al. |
| 2002/0035699 | A1 | 3/2002 | Crosbie |
| 2002/0039882 | A1 | 4/2002 | Ternullo et al. |
| 2002/0039899 | A1 | 4/2002 | Rossman |
| 2002/0042831 | A1 | 4/2002 | Capone et al. ................ 709/230 |
| 2002/0046299 | A1 | 4/2002 | Lefeber et al. |
| 2002/0049069 | A1 | 4/2002 | Johnson |
| 2002/0049905 | A1 | 4/2002 | Deo et al. |
| 2002/0052207 | A1 | 5/2002 | Hunzinger |
| 2002/0052674 | A1 | 5/2002 | Chang et al. |
| 2002/0052781 | A1 | 5/2002 | Aufricht et al. |
| 2002/0052916 | A1 | 5/2002 | Kloba et al. |
| 2002/0055917 | A1 | 5/2002 | Muraca |
| 2002/0059256 | A1 | 5/2002 | Halim et al. |
| 2002/0059459 | A1 | 5/2002 | Koka et al. |
| 2002/0069263 | A1 | 6/2002 | Sears et al. |
| 2002/0073163 | A1 | 6/2002 | Churchill et al. ............. 709/214 |
| 2002/0073196 | A1 | 6/2002 | Westervelt et al. |
| 2002/0114341 | A1 | 8/2002 | Sutherland et al. |
| 2002/0169858 | A1* | 11/2002 | Bellinger et al. ............. 709/220 |
| 2002/0178246 | A1* | 11/2002 | Mayer .......................... 709/223 |
| 2002/0188568 | A1* | 12/2002 | Nickolaisen et al. ........... 705/52 |
| 2002/0194219 | A1 | 12/2002 | Bradley et al. ................ 715/506 |
| 2003/0032409 | A1 | 2/2003 | Hutcheson |
| 2003/0139174 | A1 | 7/2003 | Rao |
| 2003/0220879 | A1 | 11/2003 | Gaughan et al. ................ 705/51 |
| 2004/0003341 | A1 | 1/2004 | alSafadi et al. |
| 2004/0070604 | A1* | 4/2004 | Bhat et al. ..................... 345/741 |
| 2004/0128342 | A1 | 7/2004 | Maes et al. |
| 2004/0236633 | A1* | 11/2004 | Knauerhase et al. ........... 705/26 |

OTHER PUBLICATIONS

Chen, Mei-Hwa; Mei-Huei Tang; Wen-Li Wang; "Effect of Architecture Configuration on Software Reliability and Performance Estimation", Jun. 5, 1998, Computer Science Department, SUNY at Albany, New York, p. 1-6.*

Montanari, Rebecca; gianluca Toni, Cesare Stefanelli; "Policy-based Separation of Concerns for Dynamic Code Mobility Management", 2003, IEEE COMPSAC03, p. 1-9.*

"4th pass Delivers Free Java Bytecode Obfuscator to JavaLobby," Java Industry Connection™, java.sun.com, May 6, 1999, 2 pages.

4thpass Dynamic Provisioning, www.4thpass.com/solutions/index.html, Apr. 16, 2002, 16 pages.

Gutzman, Alexis, "The Who, What and Why of WAP," ecommerce-guide.com®, http://ecommerce.internet.com/news/insights/ectech/article/0..9561_381271.00.html, May 26, 2000, 4 pages.

IEC: Wireless Application Protocol (WAP), International Engineering Consortium, http://www.ieg.org/online/tutorials, copyright 2002, 10 pages.

Java Develper's Journal, http://www.sys-con.com, May 20, 2002, 4 pages.

Symbian Technology, http://www.symbian.com, Mar. 2002, 39 pages.

TrueContext—collaboration for the wireless value chain, http://www.truecontext.com, Feb. 27, 2002, 28 pages.

Zuvix Tehcnology, http://211.174.63.103, May 20, 2002, 2 pages.

International Search Report; dated May 26, 2005.

UMTS: A Middleware Architecture and Mobile API Approach, 7 pages, Birgit Kreller, Anthony Sang-Bum Park, Jens Meggers, Gunnar Forsgren, Erno Kovacs, Michael Rosinus, © 1998 IEEE.

International Search Report dated May 25, 2005.

International Search Report and Opinion dated Jun. 2, 2006.

* cited by examiner

DISTRIBUTED SCALABLE POLICY BASED CONTENT MANAGEMENT

FIELD OF THE INVENTION

The present invention relates generally to content management and, more particularly, to a system and method for managing content using declarative policies.

BACKGROUND OF THE INVENTION

Today, the majority of digital content resides within computer based file systems. We use the file systems to manage our digital content by organizing it, distributing it, and controlling access in much the same way as filing cabinets manage paper-based content. Typically within an organization, digital content may be distributed across many different types of devices, linked by many different types of networks and that content may be accessed and controlled by many different types of users, on many different types of devices, under many different types of business situations.

Content management systems are becoming increasingly complex in terms of the amount of content, the number of users, the number of different devices and locations from which content is provided and must be distributed to, and the constant changing nature of business processes that use content. Enterprise IT departments are challenged to provide reliable, cost effective solutions that allow policies to be efficiently and dynamically defined in a manner that content management systems can execute in an efficient and scalable fashion. A well-implemented solution would allow users to use policies to tailor the content management system to the specific needs of the individual users in a manner that does not require any structural changes to the underlying system.

SUMMARY OF THE INVENTION

According to one embodiment of the present invention, a method for defining and constraining the behavior of a shared, mobile content management system is disclosed. The method includes providing an admin console for defining, modifying, and managing declarative policies. Declarative policies are defined based on an XML policy model. The XML policy model dictates the policies that can be expressed by the admin console. The defined declarative policies are enacted without requiring the content management system to be restarted, reconfigured, or re-implemented. An XML-based policy wizard definition language is provided to define policy wizards in the admin console that guide an administrator through the steps of creating and editing the policies. Additionally, at least one policy repository based on LDAP is provided. The at least one policy repository has an interface and is adapted to store a plurality of declarative policies. The policy repository has scalable and distributed capabilities.

According to another embodiment of the present invention, a shared, mobile content management system is disclosed. The content management system comprises an XML based declarative policy model for specifying and editing content policies. The declarative policy model including a declarative language of the form UPON <trigger> IF <condition> THEN <action>. A policy wizard for specifying: (a) new policies in a XML representation that captures a system <trigger> specifying when at least one <condition> should be evaluated; (b) that the at least one <condition> must be true in order for the policy to be applied, and (c) at least one policy <action> that must be performed when the at least one policy <condition> evaluates to true. A content management engine is adapted to evaluate the policies specified by the policy wizard.

According to another embodiment of the present invention, a content management system is disclosed. The content management system comprises a policy repository for storing a plurality of policy definition files therein. The policy definition files are written in a policy wizard definition language. An admin console automatically generates policy wizard user interfaces based the policy definition files. The admin console is adapted to specify the policy wizard user interfaces in XML as a sequence of steps that must be performed in a certain order. The policy wizard user interfaces being capable of guiding a user through the sequence of steps to create a policy. The admin console can map local and distributed LDAP DNs, system defined triggers, external triggers, systems actions, external actions, system conditions, and external conditions to natural language expressions for presentation via the generated policy wizard user interfaces.

The above summary of the present invention is not intended to represent each embodiment, or every aspect, of the present invention. Additional features and benefits of the present invention are apparent from the detailed description, figures, and claims set forth below.

Figure 1:
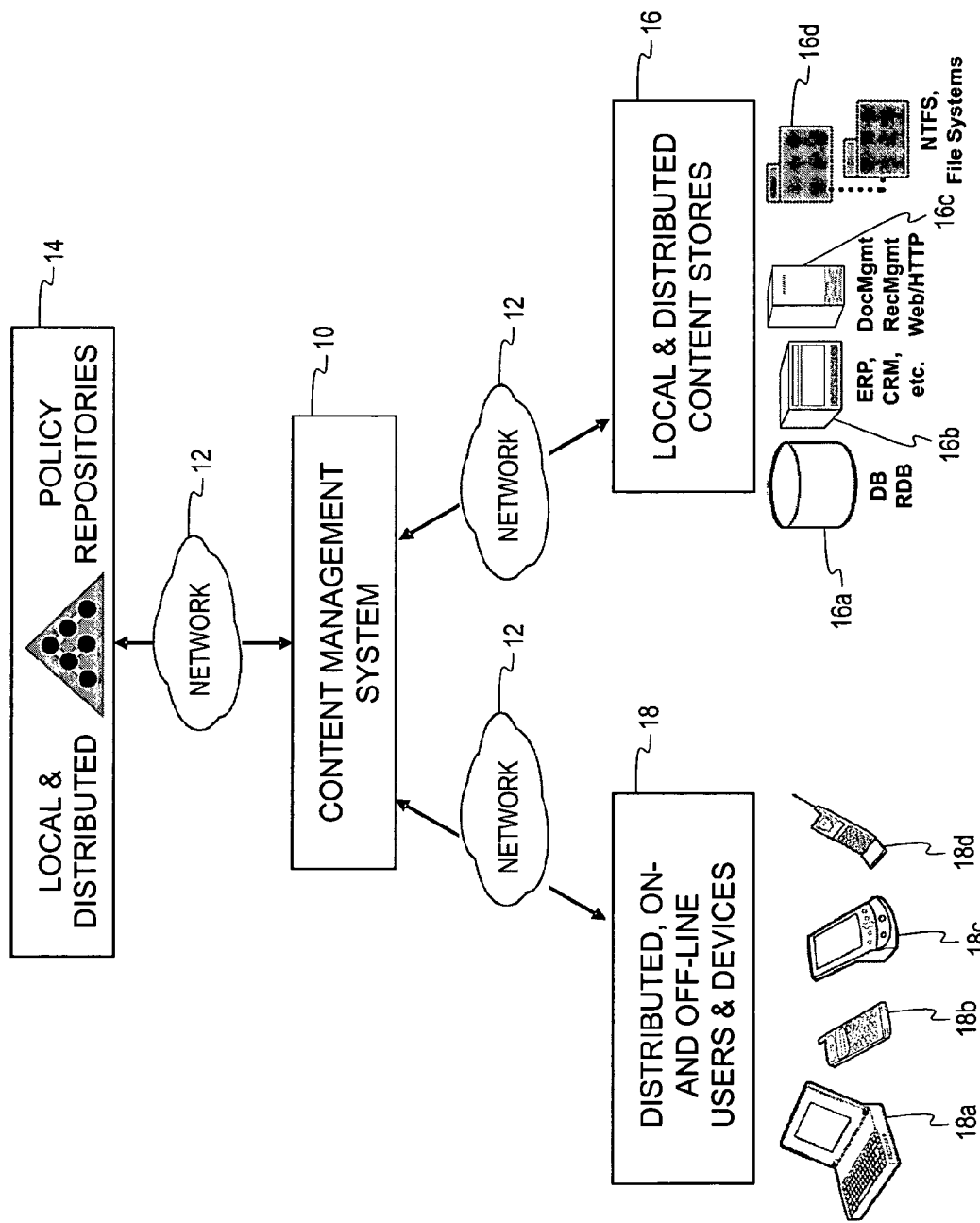
FIG. 1 is an illustration of a content management system located on a network, according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Within an organization, digital content may be distributed across many different types of devices, linked by many different types of networks. The content may be accessed and controlled by many different types of users, on many different types of devices, under many different types of business situations. To manage content under such circumstances, one needs to efficiently, securely and dynamically specify and execute the policies that define or constrain system actions in a context sensitive manner. These policies may include everything from user preferences and profiles to business rules for routing content, to administration settings for device and network capabilities. For example, a policy might specify that specific users or user groups should be notified when specific new content appears (from particular locations or particular users) and that content should be automatically distributed to the devices of those users at a particular time of day. The type of notification (e.g., SMS message, email, fax) and the form of the content (e.g., Excel file, plain text, URL) should also be able to be adjusted depending on the user's preferences and the type of device that the content is being pushed to.

To execute such a policy, a content management system would need to discover the relevant resources (e.g., available networks, available devices, content types, file system adapters, etc.), check the feasibility of the resources (e.g., can the resources be configured to achieve the desired result taking into account security restrictions, bandwidth limitations etc.), identify content that is new (by monitoring the source file systems), and distribute the content to the specified devices at the specified time. This would support both push and pull distribution models. The trigger for publishing content to a user could be a regularly scheduled event, or a specific user request. Administrators could assign users to groups that receive such content, or a user could join a group receiving content through a user initiated subscription process.

In particular, the system should allow policy changes to be made dynamically while the system is running, and not require any scripting or coding. The changes can be made by focusing on the business rules for content management not on the resource specific configuration (e.g., networks, bandwidth, connectivity, devices, etc.) that produce the result. Moreover, the system should allow these policies to be defined in a distributed fashion to support Internet Service Provider (ISP) and Managed Service Provider (MSP) models of management. For example, a central body could set up the initial system and base level policies. But detailed policy rules could be added and administered by individual departments within an organization, or individual customers of an ISP or MSP.

ISP's provide basic network infrastructure for connecting organizations to the Internet and connecting geographically dispersed employees and offices within the organization. According to one embodiment, the present invention allows ISP's to flexibly enable more sophisticated content sharing across the existing network. The ISP can define basic content management policies, but with a separate domain for each organization the ISP supports. The organization could then add their own policies within the domain on top of the ISP policies already in place.

Turning now to the drawings and initially to FIG. 1, a content management system 10 is shown within a network 12, according to one embodiment of the present invention. The content management system 10 is in electronic communication with the network 12. A plurality of systems and devices are located on the network 12 including, for example, at least one policy repository 14, at least one content store 16, and at least one user device 18. As illustrated in FIG. 1, one or more content stores may be located on a plurality of devices, such as, for example, a database or relational database 16a, an ERP system (or other manufacturing/business system) 16b, a document or resource management system 16c, or a file system 16d. The user devices 18 may be, for example, a laptop computer 18a, a cellular telephone 18b, a PDA (either cradled or wireless) 18c, or a smart phone 18d. The content management system 10 allows a user on a user device 18 to access content located in a content store 16, assuming the user has the proper permissions.

Figure 2:
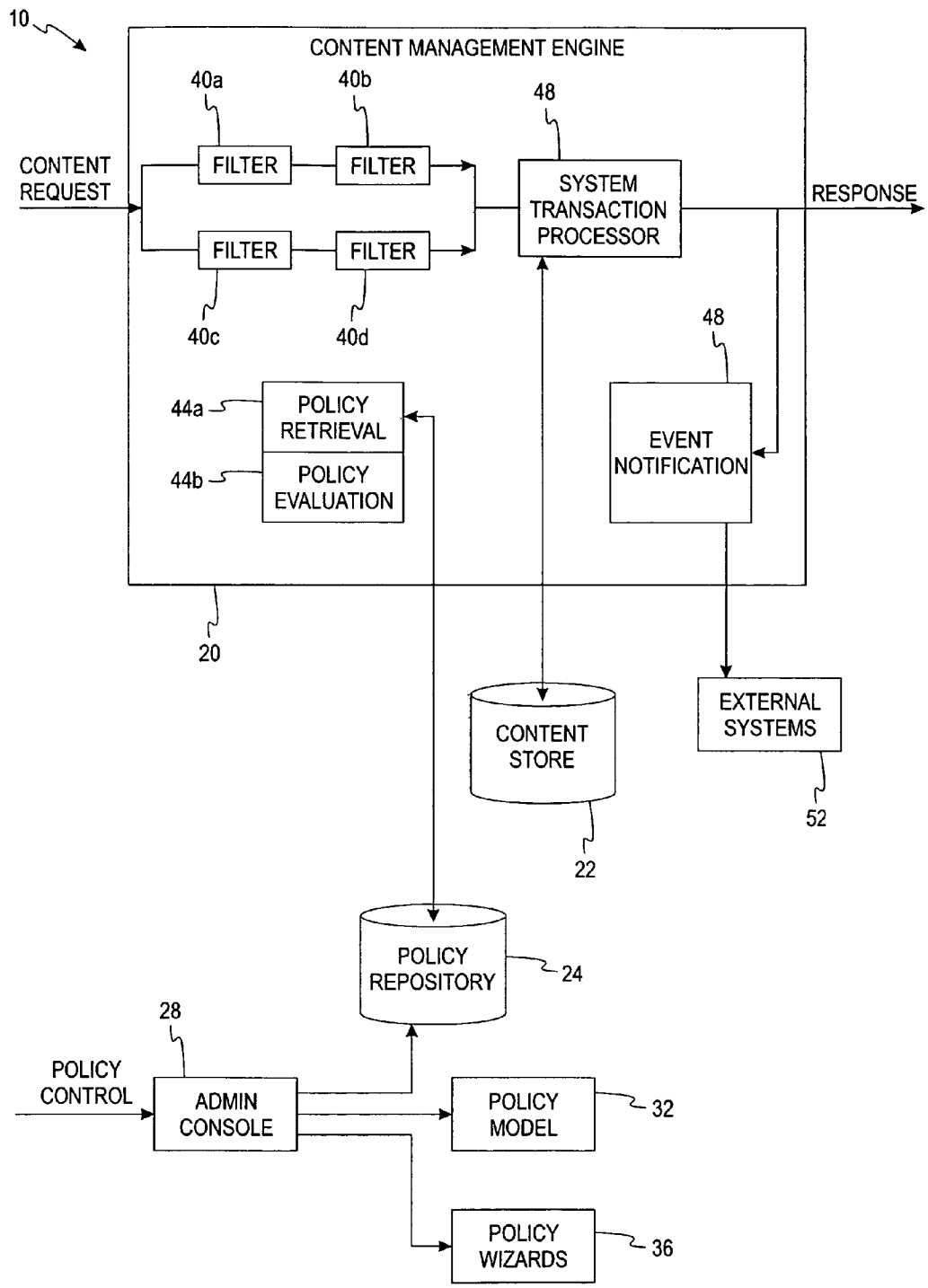
FIG. 2 is an architectural view of the content management system of FIG. 1, according to one embodiment of the present invention.

Referring now to FIG. 2, an architectural diagram showing the interaction of components and actors within the content management system 10 is illustrated, according to one embodiment of the present invention. The content management system 10 includes a content management engine 20, a policy repository 14, a content store 16, an admin console 28, a policy model 32, and a policy wizard 36.

The content management engine 20 is policy based and provides a set of actions for accessing and managing content—located on the content store 16—that are specified, configured, and triggered by policies. These policies determine how the system should behave in response to external requests and internal events. The content management engine 20 is provided with one or a plurality of policy filters and these filters can reside on a single server or across multiple servers in one or more security domains. In the illustrated embodiment, a set of four policy filters 40a-d are provided with two filters 40a-b being provided in parallel with another two filters 40c-d.

The content management engine 20 includes fully-distributed, policy decision and enforcement based on a "pipe and filter" architecture. A system transactions processor 48 is included within the content management engine 20 as well. The system transactions processor 48 requires that all system transactions pass through one or more of the policy filters 40a-d that determine which, if any, policies apply to the particular transaction. These filters 40a-d represent the policy decision points (PDP) 44a of the content management engine 20, while the system transactions processor 48 is the policy enforcement point (PEP) 44b. These policy filters 40a-d can search one or more local or remote policy repositories 14. Because all transactions pass through at least one policy filter 40a-d, it is not possible for a policy not to be enforced by the content management system 10 if it is valid. Further, the pipe and filter architecture enables policy filters 40a-d to be applied serially, in either a distributed or local fashion, or in parallel, ensuring optimal system functionality as well as the ability to enforce different policies in different locations by different system administrators. The content management engine 20 can be provided with one or a plurality of policy filters and these filters can reside on a single server or across multiple servers in one or more security domains. In the illustrated embodiment, a set of four policy filters 40a-d are provided with two filters 40a-b being provided in parallel with the other two filters 40c-d.

When a content request is made, for example, by a user on a device 18, the content management engine 20 retrieves the relevant policies from the policy repository 14. If one or more policies are found to apply, the content management engine 20 applies the appropriate policies so that the desired behavior is obtained. The order of the policy evaluation is determined by the type of policy and resources involved (according to one embodiment the mechanism uses a policy filter architecture), as well as the manner that system transactions are processed.

At a PDP 44*a*, a policy is evaluated by retrieving the policy object from a policy repository 14, evaluating the condition attributes of the policy object by either evaluating an LDAP expression and/or by evaluating calls to system actions and evaluating the action attribute if the condition attributes evaluate to TRUE. If one or more policy actions conflict, a system error is generated.

Policies are evaluated, at the PDP 44*a*, in one of two modes, outsourcing or provisioning. In the outsourcing mode, policy decisions are made dynamically. This allows the policy to evaluate information from multiple sources (such as the user's current device, and current connecting network). Alternatively, in the provisioning mode, the policy rules are compiled into specific configuration and policy parameters. For example, according to one embodiment of the present invention, security policies specified in the Extensible Markup Language (XML) declarative language are compiled into LDAP Access Control Instructions (ACI). The provisioning mode is more scalable than the outsourcing mode, but the provisioning mode is less dynamic. Both modes are used according to one implementation of the content management engine 20.

The content management engine 20 provides superior end user, network, and server/client performance in several different ways, including, but not limited to, policy retrieval and server performance. Regarding policy retrieval, the policy schema representation enables the rapid identification and retrieval of the policies relevant to a particular transaction. Policies within the policy repository 14 are indexed by system trigger(s) and condition(s). These indexes are mapped directly to LDAP domain names (DNs) and as a result can be rapidly retrieved from a LDAP registry.

Regarding server performance, the pipe and filter architecture employed by the content management engine 20 for policy decisions and enforcement enables the system to rapidly identify what policies apply to which transactions. Provisioning mode policy evaluation can be used to further improve server performance when appropriate. When the filters are deployed in serial, it is possible to enable different system administrators to apply different policies to the same transaction. For example, an enterprise might apply a security policy, while a content distributor might apply a notification policy.

The content management system 10 provides enforcement of system policies by ensuring that every system transaction passes through one or more policy filter 40*a-d* provided by the content management engine 20. This ensures that a transaction cannot pass through the system 10 without being checked to comply with the various policies contained within the policy repository 14.

The policy repository 14 stores rich, user-friendly specifications of policies in a form that is also efficient for retrieval and execution by the content management engine 20. According to one embodiment, the policy repository 14 uses the LDAP protocol and directory for the storage of system policies. The described policy repository 14 includes proprietary Content Management Policy LDAP Schema Classes, a scalable, high-speed policy indexing and retrieval algorithm, and a translator for converting between the LDAP Schema Classes and the XML syntax used based declarative policy language used for policy specification. The Policy Schema classes extend the core LDAP v 3.0 schema classes.

The policy repository 14 supports fully distributed policy decision and enforcement. Policies can be stored in a single, central policy repository or in two or more distributed policy repositories. The policy repository 14 can be any LDAP 3.0 directory such as Sun's SunOne directory server, or Microsoft's Active Directory product. Policies in the policy repository 14 can be manipulated via the LDAP v 3.0 protocols and a proprietary HTTP/XML based protocol. The policy repository 14 also enables policies to access information, and to be defined in terms of information, distributed across multiple policy engine components as well as external system components such as existing LDAP directories, databases, and software components. For example, a policy can be defined in terms of LDAP objects stored in a third-party directory and in terms of system calls to external software modules.

The admin console 28 is a graphical user interface (GUI) that allows a user to manage (add, modify, delete) policies as well as the system actions and resources (users, content, external systems, devices) that are referenced by policies. The admin console 28 includes a means for instantiating policies (turning them on), turning policies off, deleting policies, and specifying access control policies to control policy utilization as well as policy specification and editing. The admin console 28 also provides the ability to specify priorities and link related policies.

The admin console 28 includes a policy compiler/translator in both directions between the XML based declarative policy schema and the proprietary LDAP policy schema class extensions to LDAP v 3.0. In addition to translation, the admin console 28 also tests the consistency of the policies—checking for conflicts. For example, if a new policy is created using the admin console 28, policy compilation and translation will check to determine whether or not it conflicts with any existing policies.

The policy model 32 is XML based and defines the high level representation of policies, system actions, and resources which are the basis of the content management engine 20. This is an intermediate format from the GUI presented to the user in the admin console 28, and the compiled optimized format that is stored in the policy repository 14 and executed by the content management engine 20. The policy model 32 is an XML based declarative policy schema for specifying and describing policies. The policy schema describes policies in terms of their triggers, conditions, and actions.

The XML policy schema supports a number of different User Interface (UI) techniques for enabling end users to create, and modify policies. In particular, it supports the automatic generation of "policy wizards" 36 in the admin console 28 based on a Policy Wizard Definition Language that can be used to guide an administrator to create a policy by following one or more steps.

The policy wizards 36 are specified declaratively in XML. The policy wizards 36 are then utilized by the content management engine 20 to create a policy wizard UI 220 (FIGS. 6*b-e*). The policy wizard UI 220 can then be used by the administrators or other authorized users to create different types of declarative policies for storage in the policy repository 14. The admin console 28 guides an administrator or user through the definitions of policies by displaying on the GUI a dynamically generated policy wizard UI 220 using an XML-based Policy Wizard Definition Language.

Generally, present systems use solutions such as rules engines and rules editors to create and maintain system policies. These solutions are very complex and require an intimate knowledge of the product to create and maintain the policies. Though very flexible, these systems are complex and tend to overburden the end-user. Alternatively, the admin console 28 of the present invention supports a wizard-based approach that enables users to create, edit, and modify policies, without coding, in a natural language format.

When the content management engine 20 receives a content request from a user who wishes to access content from the content store 16 (as shown in FIG. 2), the request is first inspected by the policy filters 40*a-d* to determine which policies are relevant to the request. Policies are retrieved from the content management engine 20 and evaluated to determine the sequence of actions that the engine 20 needs to take in response to the request. The system transaction processor 48 executes the actions necessary to access the content in the content store (either to retrieve it or update it) and generate a response back to the user. In addition to the response, events associated with the actions are generated by the content management engine 20. These events can, in turn, be inspected by the policy filters 40*a-d* and result in more system 10 actions. One of the actions that can be taken is to notify users of events that have occurred. For example, a notification could be sent out to inform a user that content is available. These event notifications 50 may be sent out via external systems 52 in the form of emails, SMS messages, faxes, etc.

The policy model 32 supports the expression of "publish and subscribe" policies related to the digital content, users, devices, networks and other resources that are managed by the content management engine 20. These policies can be interpreted as simple rules of the form "If some condition exists, then take the following actions." Together, policies define the behavior of the content management engine 20 by configuring, constraining, and enabling the possible actions that the content management engine 20 is able to perform in response to requests and events. Users can freely add and delete policies from the policy repository 14 to affect behavior without requiring any scripting, coding or interruption of the services provided by the content management engine 20. These policies can be used to precisely tailor system functionality so that it can be quickly tailored to meet the diverse needs of the system's users.

Moreover, the content management engine 20 can be distributed across any number of locations wherever content is located inside or outside an organization's firewalls. It can also manage content that is inside or outside an organization's firewalls. This is essential for MSP/ASP business models, and for supporting mobile users who are on the road outside the office.

The content management engine 20 provides policy retrieval and evaluations, system transaction processing, and event notification to the users of the content management system 10. Policy retrieval and evaluations are used to determine the behavior of the content management engine 20 in response to requests, events, or other detectable trigger. The system transaction processor 48 performs the required actions in a secure and scalable fashion. Event notifications allows the content management engine 20 to trigger policies in response to monitored events like schedules and changed content, and to inform users and administrators of its actions. For example, a notification could be sent out to inform a user that new content is available. These event notifications 50 may be sent out via external systems 52 in the form of emails, SMS messages, faxes, etc.

In the preferred implementation of this mechanism policy retrieval and evaluation is based on a policy filter architecture to ensure scalability and facilitate the process of matching policies to requests and events. Different policy filters can manage different types of policies and configure different types of system resources. Depending on the filter they can be run serially or in parallel to maximize throughput and scalability.

Figure 3:
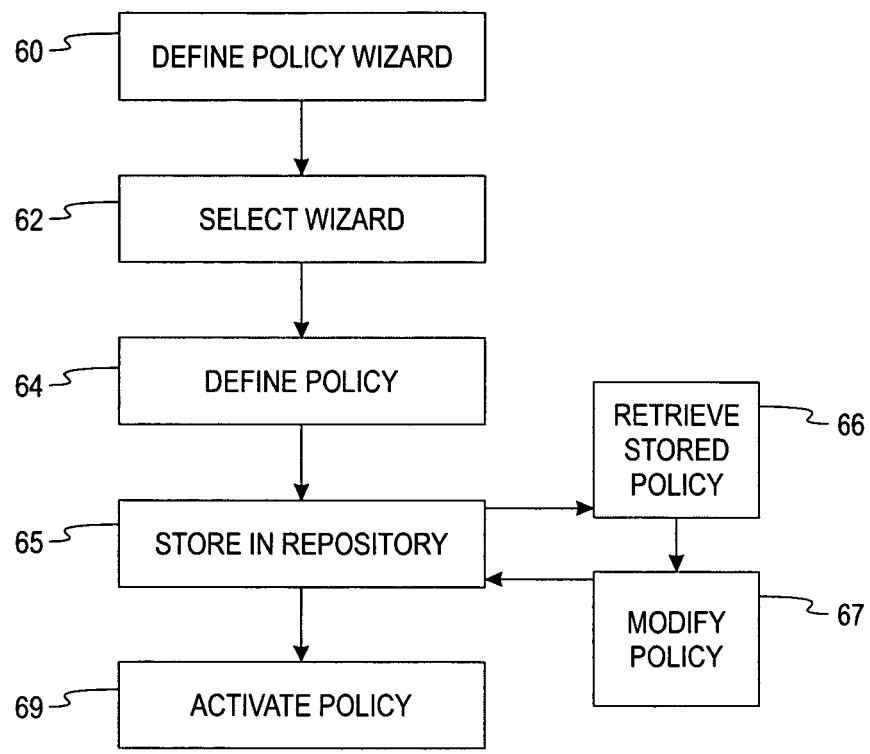
FIG. 3 is a flowchart illustrating defining a policy by, and for use in, the content management system of FIG. 1, according to one embodiment of the present invention.

FIG. 3 is a flowchart illustrating the creation of a policy by a developer and/or administrator utilizing the policy wizard 36 of the admin console 28, according to one embodiment of the present invention. First, the policy wizard 36 is defined by an XML file written using the Policy Wizard Definition Language (PWDL), at step 60. The policy wizard 36 is generally written by a developer for later use by an administrator. The administrator can then select the policy wizard 36, at step 62, in the admin console 28 to define a new policy. The new policy is defined, at step 64, by following a plurality of steps that the policy wizard 36 guides the administrator through. Once the wizard 36 has been completed then the newly-defined policy is stored in the policy repository 14, at step 66. The system administrator can retrieve stored policies, at step 66, and modify the policy, at step 67. The administrator may change any number of items by selecting, from the admin console 28, the stored policy in the policy repository 14. The administrator can then re-proceed through the steps with the policy wizard 36 as the guide. The modified policy may then be stored in the repository, at step 65. Once the system administrator is satisfied with the policy it can be activated, at step 69, in the policy repository 14. At that point, the content management engine 20 will apply the policy where appropriate using its policy retrieval and evaluation components 44*a-b*.

The policy schema representation is compliant with the Java Architecture for XML binding (JaxB). In the preferred implementation for this mechanism, JaxB is used to allow a wizard engine to "read" wizard definition files to create an effective, easy to use user interfaces. In the current implementation, a tag embedded in the admin console 28 parses the wizard definition files (policy wizards 36). This tag then intelligently determines which step of the wizard the user is on, and provides the user with the appropriate options to choose from. While PWDL is used to define—and automatically generate—wizards for creating policies, PWDL can be applied in any situation where a complicated set of parameters must be assigned values by end users.

In the admin console 28, each policy is mapped to a number of definition files generated by PWDL. The wizard definition files—generated in PWDL—each define a single policy wizard UI 220. These files are stored to enable future policy modification and editing, at steps 66-67, and are also translated into policies that are stored in the policy repository 14.

The wizard definition files describe policy wizard details, such as, how many steps does the wizard contain, what are the users prompts for each step, what are the options available in each step, what are the interdependencies between options from one step to another, what conditions may apply, which actions should this policy fire, etc.

The admin console 28 utilizes the wizard definition files to automatically generate a policy wizard UI. The preferred instantiation of the wizard UI is a Web based UI, though this is not required for the invention. The wizard definition files are easily extensible to enable the addition of new policy wizard information such as might be required by different UIs.

In addition to describing wizard details, PDWL can record a user's choices in a PWDL described wizard. By recording a user's choices, PWDL can be used to edit or modify an existing policy with the original choices "pre-selected" in each step. In addition, PWDL can be used to generate a natural language description of the policy in which the user's choices are "highlighted" using a variety of techniques such as "color coding," "bold type," and "italic type."

If the wizard definition language is ever modified, say by adding additional policy wizard details, then all existing policies that have been generated using the language can be tested for validity against the new PWDL schema. Since the wizard definition language is XML, it is human readable, enabling policies to be modified by directly editing the XML descriptions of the policies instead of using a policy wizard UI. Enabling direct editing of the XML descriptions maximizes the systems flexibility—allowing users who are well-acquainted with policies to create and edit them without assistance from a developer.

According to one embodiment, the policy wizard 36 is designed to take advantage of the Java 2 Enterprise Edition (J2EE) framework, the Apache Struts framework, the Apache Taglib framework, the JavaScript programming language, and the Java Architecture for XML binding (JaxB) technology. The current implementation uses JaxB to convert the XML documents that define the wizards into Java Objects. These Java objects are referred to within an Apache Taglib tag embedded in a J2EE JSP. The user's choices are stored in the JSP using JavaScript, and processed using a Action Handler from the Apache Struts framework.

The JSP page has JavaScript embedded in it for tracking the user's choices while they are on a particular step. These choices are passed to the Action Handler when the user requests to move to another step. The JavaScript also populates the JSP Form with the choices the user has made when a policy is being edited. The policy wizard step tag allows the presentation layer of the admin console 28 to have an intimate knowledge of the Java Objects created by the JaxB compiler, without exposing them to the JSP designer. This design achieves a clear separation between the presentation logic in the JSP and the wizard logic that is in the PWDL tags. The tag reads the wizard definition file, and then writes the UI components required to the JSP. When submitted, the user choices (passed in XML format) are converted to Java Objects in the Action Handler using JaxB. The Action Handler then either creates a new policy object, or if the user is editing an existing policy, retrieves the policy from the LDAP policy repository and modifies it. The policy is then stored in the policy repository 14.

Policies can be specified using conditional rules of the form:

IF some condition is true, THEN perform this action.

Using the admin console 28, a user with the appropriate system privileges, specifies the behavior of the content management engine 20 by defining new policies (step 64) or modifying existing policies (step 67). The language of the policies is defined by the policy model 32 which defines the conditions and actions that are possible and, more importantly, the system resources that can be referenced when specifying the policies. According to one embodiment, the policy wizards 36 are defined and the admin console 28 uses the wizards to guide a user through the possible choices for creating a policy.

Once the desired policies have been created, the administrator may activate them, at step 69. This has the affect of compiling the policy into the policy repository 14 so that it can be retrieved and executed by the content management engine 20. When a policy is executed, the content management engine 20 provisions and configures the content network resources that are required to obtain the desired behavior. For example, if an administrator wishes to set up a content network that enables the automatic distribution of digital content from a particular supplier to a particular user at a particular time of day they might specify a policy of the form:

Whenever supplier X has new digital content, install that content on user Y's device between 9 p.m. and 11 p.m. and notify the user dynamically according to the method defined in their user preferences (email, SMS, fax).

Underlying this relatively simple policy might be a variety of different system resources. Each of these has to be configured so that the desired result is achieved. For example, security provisioning must ensure that user Y can access supplier X's content, the distribution system must ensure that the content can actually be installed on user Y's device, and the network that connects Y to the content must be adequate to the task.

Once a policy has been activated, the content management engine 20 automatically identifies when the policy should be executed. In other words, it identifies what "triggers" the policy's application. Sometimes the policy triggers are internal to the content management engine 20 and sometimes they are external. In the previous example, the content management engine 20 may utilize an event notification sub-system 48 (FIG. 2) that wakes up at specified times such as at 9 p.m.

Sometimes triggers result from user requests to the content management engine 20. For example, a user with a PDA device requests a list of all the content that they can consume. In response to the request, the policy engine retrieves the set of policies that are applicable to the current user and their request and executes them, resulting in a sequence of system actions, and possibly the triggering of other events. The retrieval and execution of policies is performed through the policy filter framework that can flexibly control the order in which policies are retrieved, evaluated, and executed depending on the types of content, resources involved, and other factors like the time of day, current load, and network bandwidth.

Figure 4:
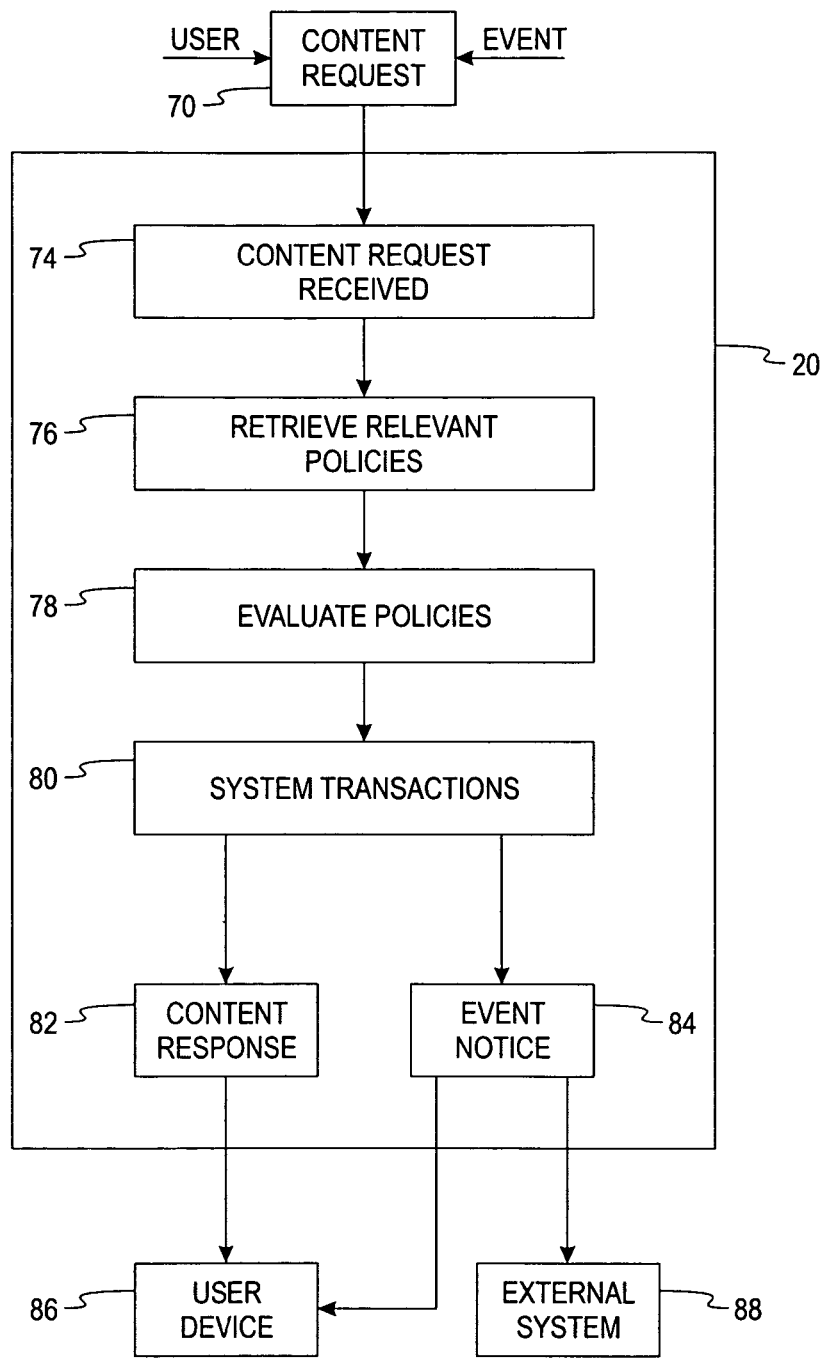
FIG. 4 is a flowchart illustrating the retrieval and evaluation of a policy by a content management engine, according to one embodiment of the present invention.

Referring now to FIG. 4, a method for responding to a content request by the content management engine 20 is illustrated, according to one embodiment of the present invention. At step 70, a request for content is made either by a user or when an event has occurred. The content request is then received by the content management engine 20 (FIG. 2), at step 74. The filters 40*a-d* (FIG. 2) of the content management engine 20 then search the policy repository 14 to determine the relevant policies associated with the particular request and, at step 76, the relevant policies are retrieved by the content management engine 20. These policies are then evaluated, at step 78, by the system transaction processor 48 (FIG. 2). The system transaction processor 48 initiates one or more system transactions, at step 80, based on the evaluation of the policy in association with the content request. For example, the system transaction processor 48 may generate a content response, as step 82, or an event notice, at step 84. The content response generated at step 82 can then be communicated to a user device 18 (FIG. 2), at step 86. Similarly, the event notice generated at step 84 can then be communicated to a user device 18, at step 86, or to an external system, at step 88.

Figure 5:
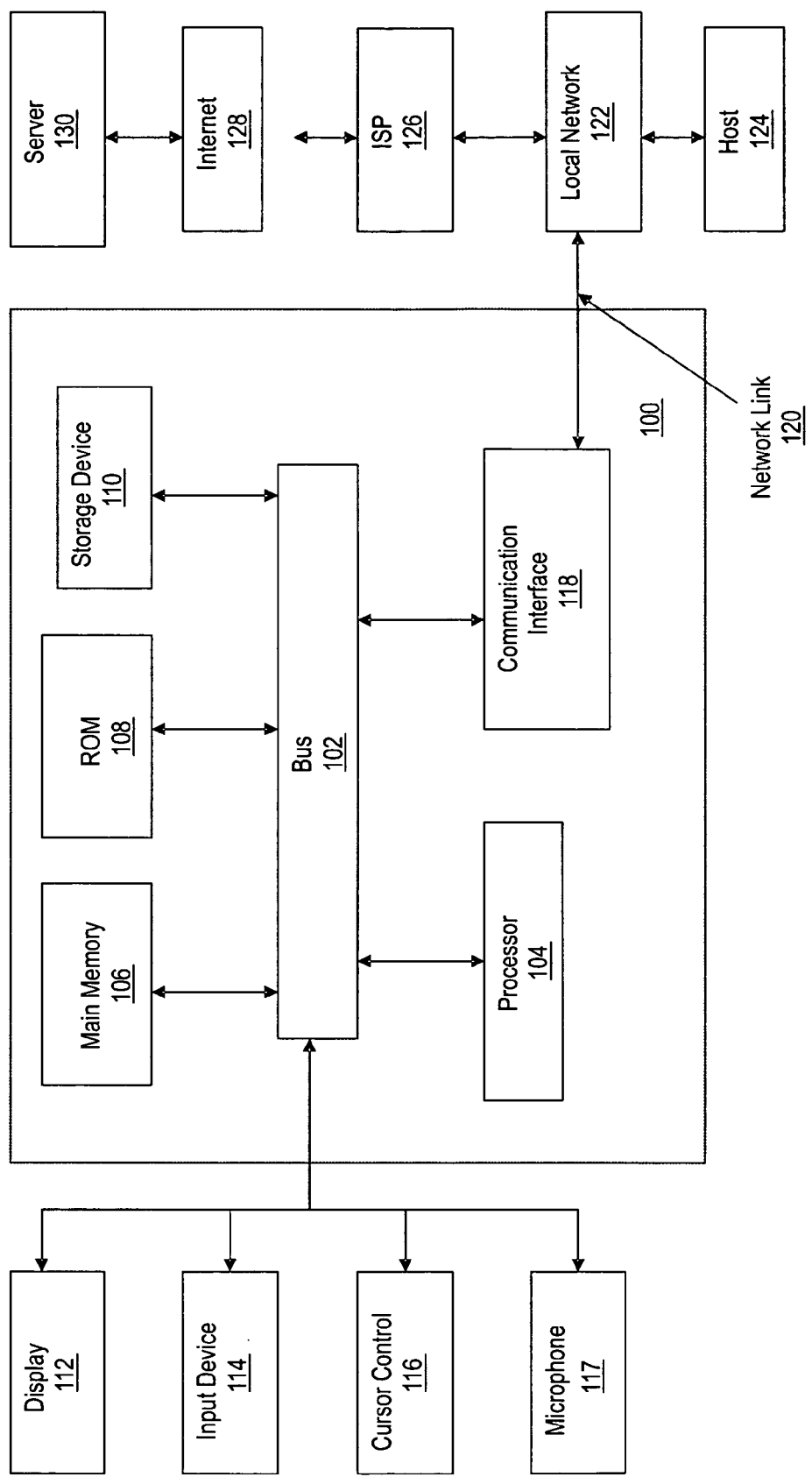
FIG. 5 is a block diagram that illustrates a computer system upon which embodiments of the invention may be implemented, according to one embodiment of the present invention.

FIG. 5 is a block diagram that illustrates a computer system 100 upon which embodiments of the invention may be implemented. Computer system 100 includes a bus 102 or other communication mechanism for communicating information, and a processor or processors 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as, for example, a magnetic disk or optical disk, is provided and coupled to bus 102 for storing information and instructions.

Computer system 100 may be coupled via bus 102 to a display 112, such as a cathode ray tube (CRT), liquid crystal display (LCD), or may be a handheld active or passive display, for displaying information to a computer user. An input device 114, including alphanumeric and other keys, is coupled to bus 102 for communicating information and command selections to processor 104. Other user input devices include cursor control 116 or microphone 117. Cursor control 116 may include one or more of any number of devices, such as, for example, a mouse, a trackball, or cursor direction keys for communicating direction information and command selections to processor 104 and for controlling cursor movement on display 112. The cursor control 116 typically has two degrees of freedom in two axes, a first axis (e.g., x) and a second axis (e.g., y), allowing the device to specify positions in a plane.

Execution of sequences of instructions contained in main memory 106 causes processor 104 to perform the process steps described above. One or more processors in a multi-processing arrangement may also be employed to execute the sequences of instructions contained in main memory 106. In alternative embodiments, hard-wired circuitry may be used in place of or in combination with software instructions and it is to be understood that no specific combination of hardware circuitry and software are required. Instructions may be provided in any number of forms such as source code, assembly code, object code, machine language, compressed or encrypted versions of the foregoing, and any and all equivalents thereof. "Computer-readable medium" refers to any medium that participates in providing instructions to processor 104 for execution and "program product" refers to such a computer-readable medium bearing a computer-executable program. The computer usable medium may be referred to as "bearing" the instructions, which encompass all ways in which instructions are associated with a computer usable medium. Computer-readable mediums include, but are not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. Instructions received by main memory 106 may optionally be stored on storage device 110 either before or after execution by processor 104.

Computer system 100 may also include a communication interface 118 coupled to bus 102 to provide a two-way data communication coupling to a network link 120 connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information. Thus the processing required by method of the invention described by way of example herein may be implemented on a local computer utilizing storage device 110 or may be implemented, for example, on a LAN or over the Internet.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accord with the invention, one such downloaded application provides for transmitting an inspection procedure to an inspector at a remote inspection data from a central computer and receiving, in the central computer, information transmitted from the inspector at a remote location to permit processing of the inspection information by the central computer. The received code may be executed by processor 104 as it is received, and/or stored in storage device 110, or other non-volatile storage for later execution. In this manner, computer system 100 may obtain application code in the form of a carrier wave.

The policy model 32 (FIG. 2) utilized by the content management engine 20 will now be more fully described. As discussed above, a content management policy is a high level statement of intentions. A policy is specified as a conditional declarative statement of the form:

UPON <trigger> IF<condition> THEN <action>

The <action> is only performed if the <condition> statement logically evaluates to TRUE, when the system <trigger> exists.

A <trigger> may be any detectable event in the content management engine 20 (FIG. 2). The trigger can be internal to the content management engine 20 (e.g., created by some system component such as an event notifier) or external to the content management engine 20 (e.g., created by a component external to the content management engine 20 such as a corporate Lightweight Directory Access Protocol directory). Triggers can also be related to a user action, such as, requesting a new piece of content or a system generated event, such as, a particular time and date being reached. The content management engine 20 currently exposes all available actions as triggers in the policy language. New system triggers are made available by exposing the required business logic or by exposing the Application Program Interface (API) calls to external systems.

A <condition> is usually represented as a disjunction (logical OR) of expressions about the current state of the content management engine 20. In other words, if at least one of the expressions is true, then the <condition> evaluates to true and the <action> will be performed. Each expression in the listed <condition> can be represented as either (1) a well-formed Lightweight Directory Access Protocol (LDAP) search string, or (2) a conjunction of logical predicates and/or propositions that map to system defined methods (methods implemented in the business logic and exposed in the policy language) or standard mathematical methods supported by the LDAP programming language (e.g., equals, greater than, less than, similar to, etc.). Each method can take as arguments Distinguished Names (DNs) of objects in system accessible LDAP registries such as the DN for a user profile or a particular device profile. For example, a mathematical method "greater than" might take as arguments a constant "20" and a DN that maps to the maximum amount of available memory on a particular device. When the mathematical method is evaluated it returns TRUE if the amount of available memory is greater than 20 and FALSE otherwise.

The <condition> is written as:

Expression1 or Expression2 or Expression3 or . . . or ExpressionN such that "OR" is a logical or, and each Expression is written as:

Predicate1 and Predicate2 and Predicate3 and . . . and Predicatej such that "AND" is a logical and. Alternatively, each Expression can be written as a well-formed LDAP search string that evaluates to the null set if the result of the search is FALSE and the non-null set if the result is TRUE. Each <condition> statement maps to a multi-valued LDAP object attribute in a Policy object. Each C1 maps to one of the values of the multi-valued attribute. In LDAP, multi-valued attributes map directly to disjunctions of the attribute values and evaluate to a null set none of the attributes are TRUE or map to a non-empty set if one or more of the attribute values are TRUE.

The <action> is represented as a conjunction of ACTIONS, such as:

A1 and A2 and . . . and AN

All $A_i$ in <action> map to either (1) an API call supported by the content management engine 20, or (2) a well-formed LDAP string that performs a LDAP action upon a LDAP registry such as a deletion, an insertion, or a modification. Within each <action> statement, the individual actions $A_i$ are ordered. That is, A1 is evaluated before A2, and so on.

The content management engine 20 distinguishes between two kinds of policies, (1) those that persist throughout the life cycle of the system, or change very infrequently, and (2) those that are subject to frequent change and only apply or are relevant for specific periods of time. Persistent policies remain relevant for long periods of time. Persistent policies can be modified or deleted and are considered relevant if they exist as instantiated policies within the policy system.

Alternatively, transient policies are relevant over a specific period of time or between specific system triggers. Typically, the time period is relatively short in duration and is terminated by a specific system action. An example of a transient policy in the content management engine 20 is one, such as, "IF the user's device is connected on a 802.11 network, THEN copy this item to that device." In this example, the policy is not relevant until the user connects using a 802.11 network. When the user does connect, the system generates the transient policy. The policy results in a specific piece of content being copied to the user's device. Once the item has been copied, the policy is no longer relevant and is either inactivated or deleted from the policy repository 14.

The content management engine 20 utilizes transient policies as an alternative to status flags to specify what system actions have to be performed on system resources. For example, instead of setting a status flag on an item (and specifying the system schema required to do so), the content management engine 20 instantiates transient policies that have the same effect. Instead of setting a status flag on an item in a user profile that is interpreted as "this item is not currently on the user's device and should be," the content management engine 20 can specify a transient policy that is applied when the relevant conditions are met, such as, "the user's device is currently connected to the server, so execute the policy." Instead of searching through all the system resources for status flags, the content management engine 20 can simply identify the relevant transient policy and evaluate it.

The content management engine 20 provides an extension to the LDAP v 3.0 policy schema that enables it to represent policy specific information. Because the content management engine's 20 LDAP policy schema extends the LDAP standard, the policies can be stored on any LDAP v 3.0. compliant directory including Sun's SunOne directory server, and Microsoft's Active Directory product.

As discussed above with respect to FIG. 2, the policy wizards 36 enable administrators to specify different types of policy wizard files declaratively using an XML-based PWDL. FIGS. 6a-e describe and illustrate the creation of policies utilizing a policy wizard UI generated by the admin console 28 from the policy wizard file created by the policy wizard 36, according to some embodiments of the present invention.

A policy wizard UI 220 is a technique for enabling users to perform complex tasks in which a number of parameters must be assigned values in order for a system to behave appropriately. Typically, a wizard encapsulates a set of steps that a user must follow. These steps are generally ordered and each step can consist of one or more options. Wizards can be implemented in a number of different ways. Typically, they are hard coded by a system programmer utilizing some programming language or web based representational format such as HTML. The difficulty with this approach is that it is relatively difficult to create "new wizards." Each wizard requires a programmer to implement the desired solution. The present invention, however, allows new wizards to be created using the policy wizard 34. Thus, as will be described with respect to FIGS. 8a-b, new wizards can be created without requiring an administrator to hard code the desired solution.

FIGS. 6a-e will discuss the utilization of a policy wizard UI—generated by the admin console 28—for allowing an administrator or user to generate policies that the content management engine 20 can retrieve and evaluate from the policy repository 14.

Figure 6A:
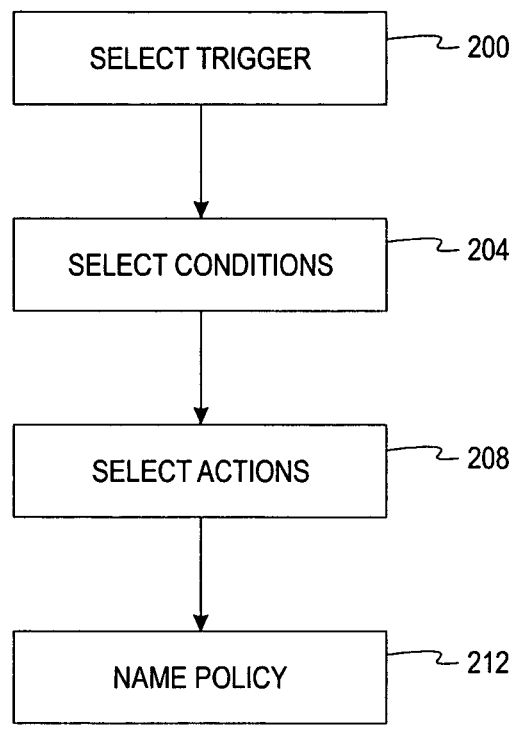
FIG. 6a is a flowchart illustrating a method utilized by a policy wizard user interface to assist an administrator in creating a policy, according to one embodiment of the present invention.
Figure 6B:
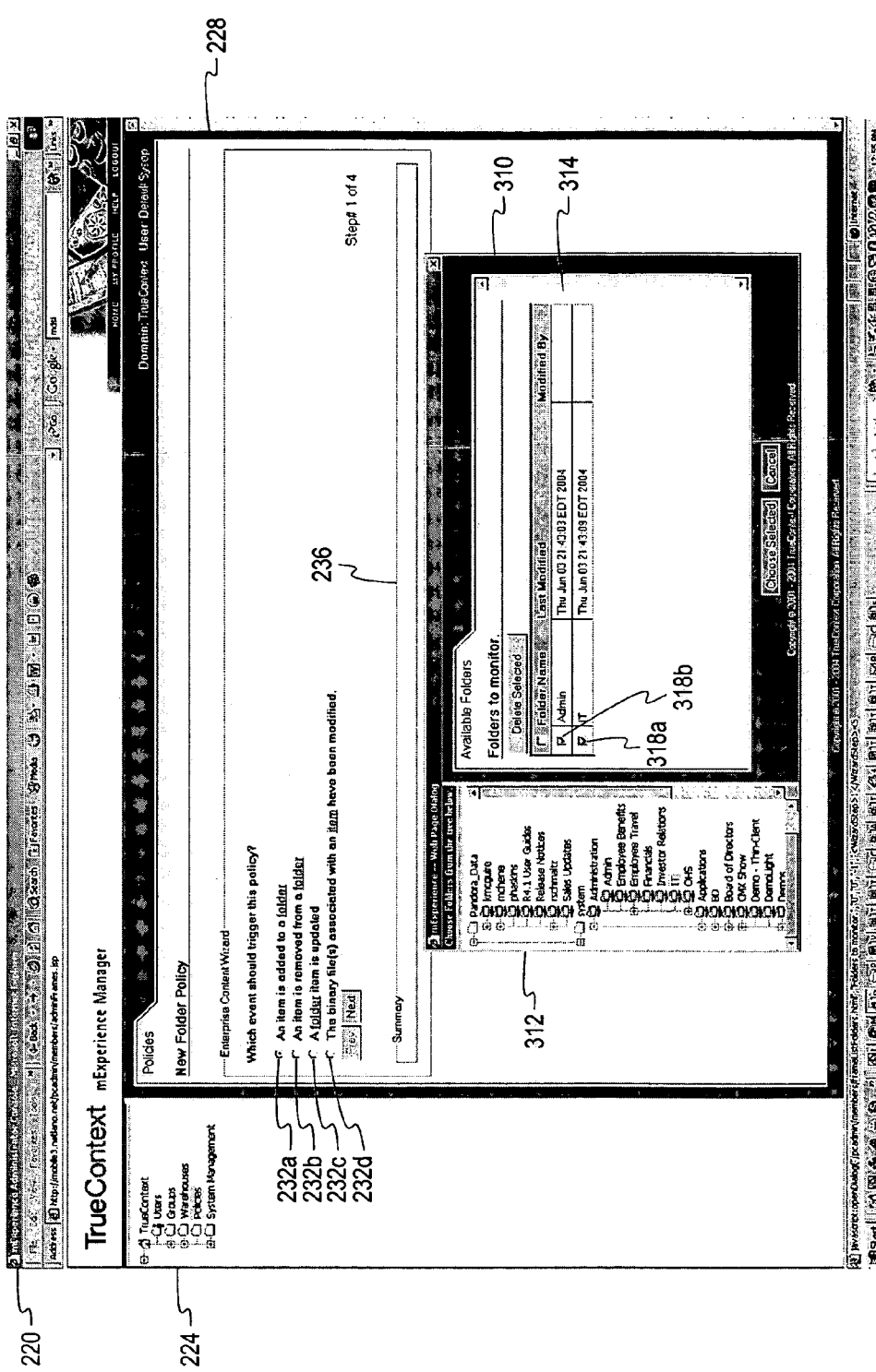
FIG. 6b is a screen view of a policy wizard user interface, according to one embodiment of the present invention.

Referring now to FIG. 6a, a method for defining a catalog policy is illustrated according to one embodiment of the present invention. A catalog policy is a set of policies that apply to captured content items that either: automate the notification of changes within the catalog via email or SMS;

install new or modified items; or de-install items deleted from the catalog. At step 200, an event is specified to serve as a <trigger> for the policy. As illustrated in FIG. 6b, a policy wizard UI 220 is shown that may be displayed on the UI of the admin console 28 (FIG. 2). The policy wizard UI 220 includes a directory frame 224 and a definition frame 228. The definition frame 228 is used by an administrator to define the policy being created. As illustrated in FIG. 6b, an administrator or user is provided four options to select a <trigger> from. The administrator may, for example, select "the addition of an item to a folder" as the <trigger> by choosing radio button 232a. Alternatively, the administrator may select "the removal of an item from the folder" as the <trigger> by choosing radio button 232b or "the update of a catalog item" may be selected as the <trigger> by choosing radio button 232c. Further, the administrator may select "the binary file(s) associated with an item have been modified" as the <trigger> by choosing radio button 232d. When either of the first three radio buttons 232a-d are selected, the administrator can define the folder or folders that the policy should apply by utilizing the folder sub-frame 310. When the fourth radio button 232d is selected, in this example, the administrator can define the item that the policy should apply with an item sub-frame similar to the folder sub-frame 310.

The folder sub-frame 310 includes a directory area 312 and definitional area 314. The definitional area 314 allows the administrator to select from the available folders. Each available folder that can be monitored is provided with a checkbox 318 that can be selected. The administrator, in the illustrated example, may select to monitor either or both of the admin folder or the IT folder by selecting the corresponding checkbox 318a and/or 318b, respectively.

The definition frame 228 is also provided with a "wizard summary" box 236. The wizard summary box 236 may be used to display to the administrator a natural language explanation of a policy utilizing the selected <trigger>, Once a <trigger> has been selected, the administrator selects the "next" button 240 to move on to the next step of the wizard.

Figure 6C:
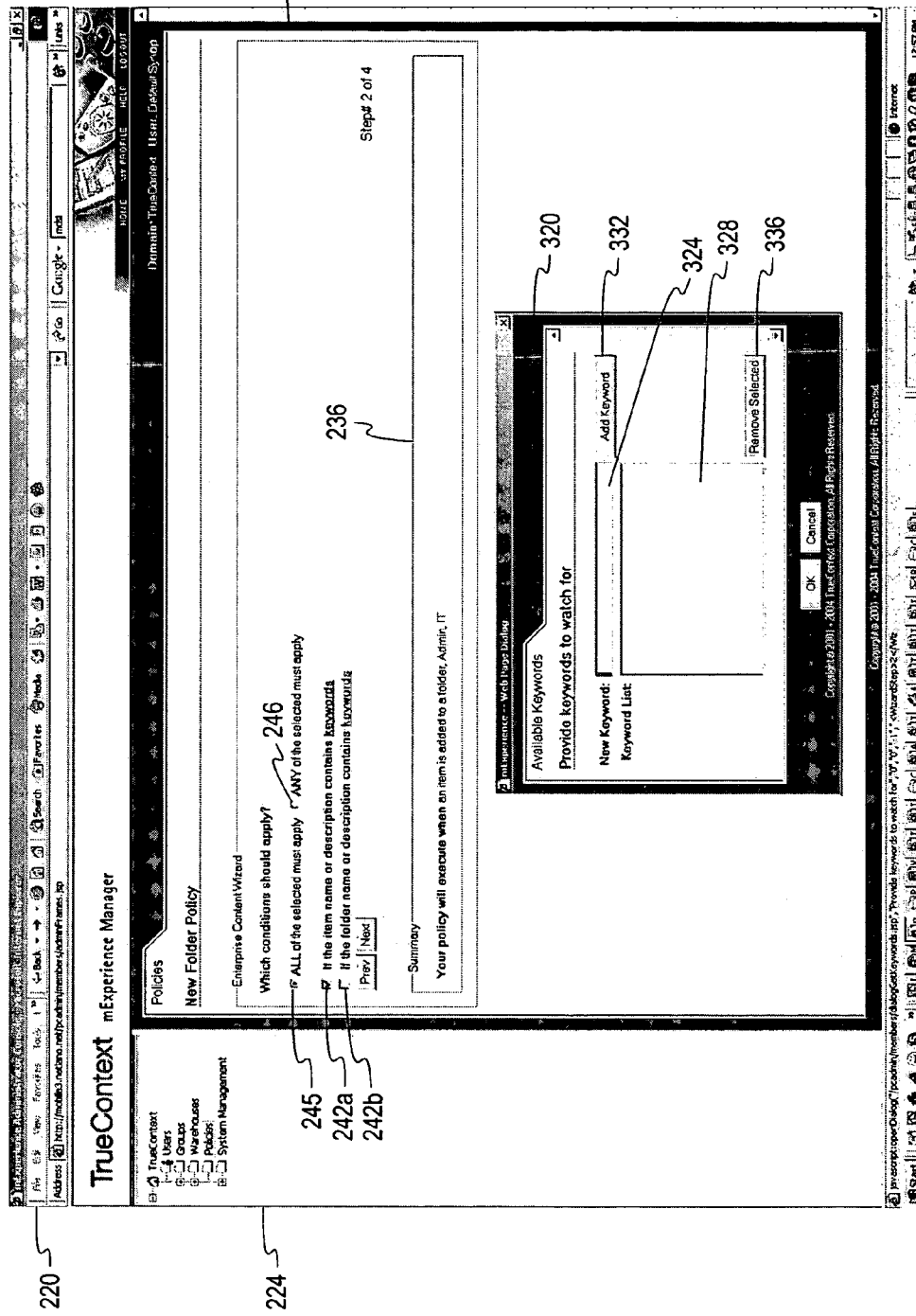
FIG. 6c is a screen view of the policy wizard user interface of FIG. 6b, according to one embodiment of the present invention.

Referring again to FIG. 6a, once the administrator has selected a <trigger>, at step 200, the administrator is then prompted to select one or more <condition> for the chosen <trigger>. As illustrated in FIG. 6c, the administrator may select one or more <condition> by choosing from a plurality of checkboxes 242a-b. Each checkbox 242a-b represents a <condition> that may be associated with the <trigger> selected in step 200, and multiple <conditions> can be assigned for each checkbox by utilizing the "keywords" sub-frame 320. The keywords sub-frame 320 includes a "new keyword" field 324 and a "keyword list" box 328. The administrator can enter a specific keyword into the new-keyword field 324 and then assign the entered keyword by selecting the "add keyword" button 332. The keyword-list box 328 contains a listing of all of the assigned keywords. An assigned keyword can be unassigned by selecting the appropriate keyword and then selecting the "remove selected" button 336.

After selecting one or more <condition> and assigning the desired keywords to each condition, the administrator can select the "next" button 240 to move on to the next step of the wizard or may select the "prev" button 244 to return to the previous step of the wizard. The administrator, thus, is able to set the conditions under which the policy is valid. The administrator can choose whether all of the selected conditions must be true (AND) by selecting radio button 245, or whether any of the selected conditions apply (OR) by selecing radio button 246. As illustrated in FIG. 6c, the wizard-summary box 236 provides a natural language description of the created policy to through this step to the administrator.

Figure 6D:
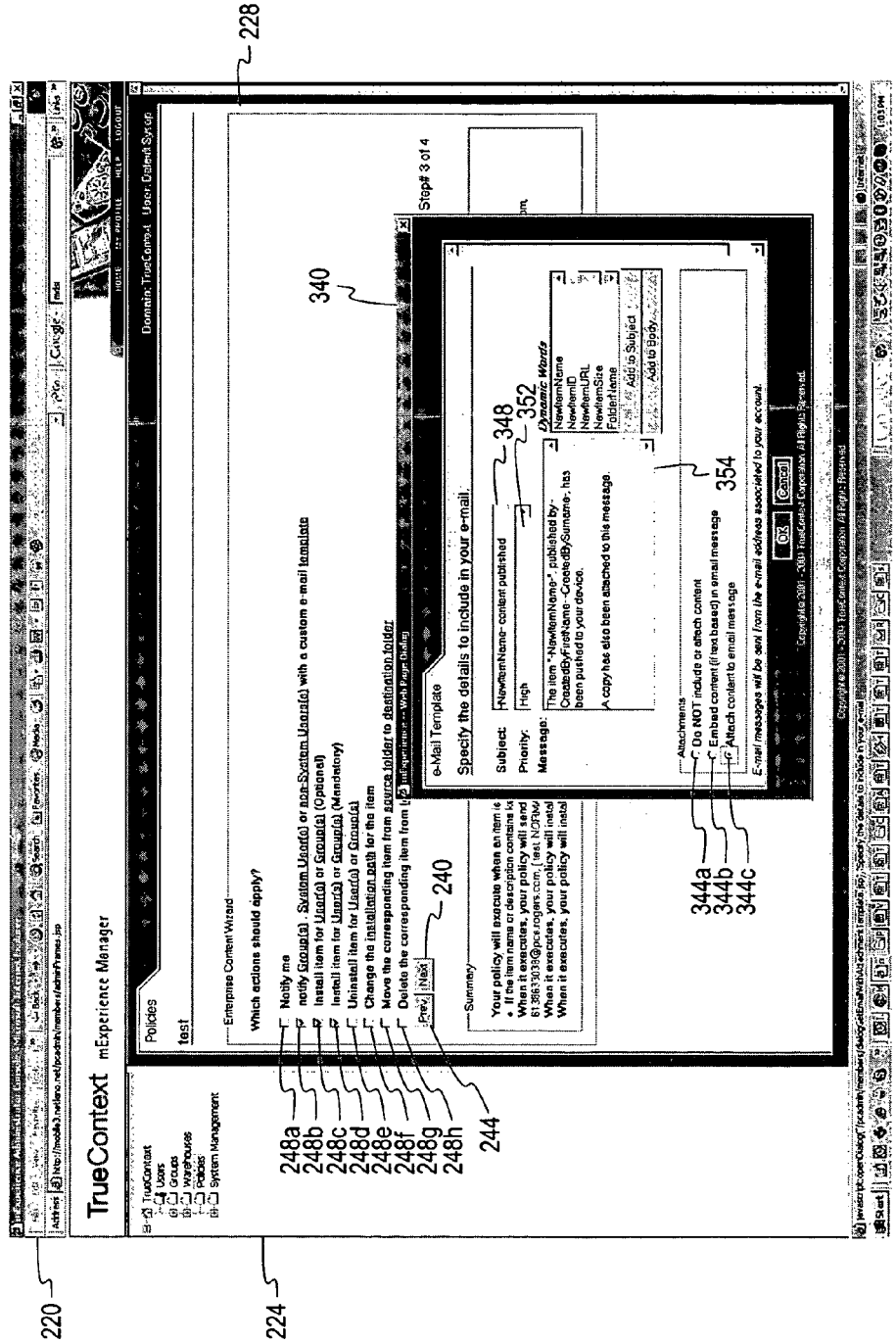
FIG. 6d is a screen view of the policy wizard user interface of FIG. 6b, according to one embodiment of the present invention.

Turning once again to FIG. 6a, once the administrator has selected both a <trigger> and one or more <condition>, the administrator is prompted to select the <action> or outcome of the policy. The administrator may also specify the target users or groups of users for the selected <action>. As illustrated in FIG. 6d, the administrator may select one or more <action> by choosing from a plurality of checkboxes 248a-h. Similar to FIG. 6c, each checkbox 248a-h represents an <action> that may be associated with the <trigger> selected in step 200. After selecting one or more <action>, the administrator can select the "next" button 240 to move on to the next step of the wizard or may select the "prev" button 244 to return to the previous step of the wizard.

If the administrator selects to use a custom e-mail template, an e-mail template sub-frame 340 can prompt the administrator to create a custom email to be sent with the item, as illustrated in FIG. 6d. From this template, the administrator can specify whether the e-mail should include or attach the content, or whether the content should be embedded in or attached to the email—by selecting the corresponding radio button 344a-c. The administrator may also specify a subject for the e-mail by inserting the subject into a "subject" field 348. The administrator may also select a priority setting, such as, low, medium, or high, by using the drop-down menu bar 352. The administrator can additionally insert a standard message to be sent with the content by utilizing the "message" field 354.

Figure 6E:
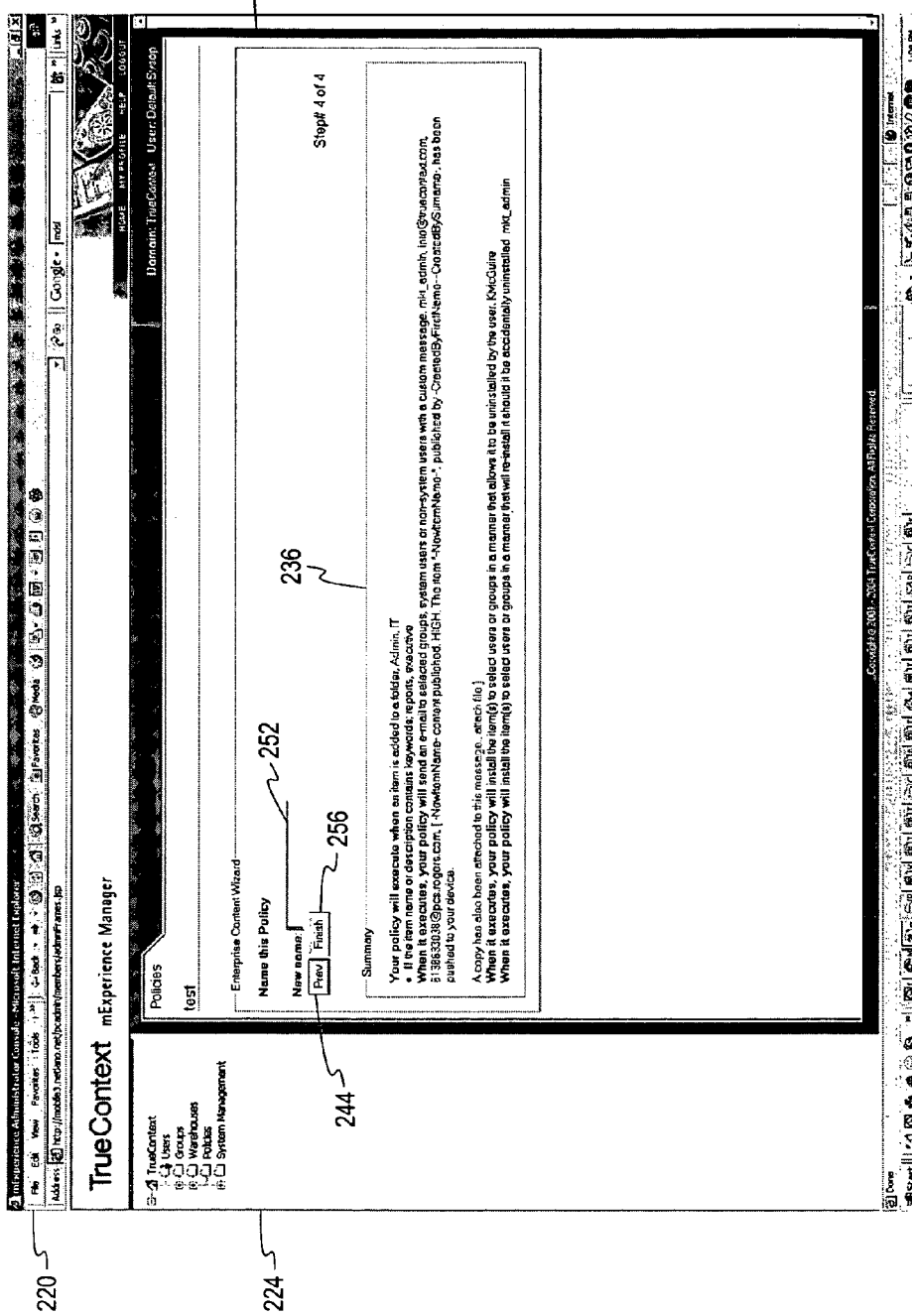
FIG. 6e is a screen view of the policy wizard user interface of FIG. 6b, according to one embodiment of the present invention.

Returning to FIG. 6a once more, the administrator is prompted to name the newly-created policy, at step 212, so that it may be viewed and/or edited at a later time. As illustrated in FIG. 6e, the wizard prompts the administrator to insert a name for the newly-defined policy into the field box 252. If the specified policy name does not conflict with an earlier defined policy, the policy will be saved into the policy repository 14. Alternatively, if the policy name does conflict, the administrator is prompted to either rename the policy or over-write the previously-created policy. The wizard-summary box 236 enables the administrator to determine the results of the policy by providing a natural language description of the policy to the administrator. Once the policy has been named and saved to the policy repository 14, the administrator may select the "finish" button 256 to exit the wizard.

Referring again to FIG. 6a, the method may also be used to define a logging policy, according to another embodiment of the present invention. A logging policy is a set of policies that apply to the logging of events in the system. Once the event occurs and conditions matched, an entry may be made in a log file or an email/SMS notification sent to specified user(s).

The method of FIG. 6a may also be used to define a network policy, according to another embodiment of the present invention. The content management system 10 (FIGS. 1-2) provides a content distribution function that queues files pending user connection in response to one or more of the following: (1) conditional policy actions; (2) administrator push; and (3) requests by the user.

A given usage scenario may afford the user a choice of network services over time, from expensive, low bandwidth general packet radio services (GPRS) when they are on the road to "free," high bandwidth LAN at their desk using a cradle. With choice comes the option to defer fulfillment of a large, or low value file (or other content request) to a time where it may be more effectively delivered. The content management engine 20 can determine the network service where the connection is between the optional client and server. On reconcile, the policy will identify the type of connection and apply conditional tests to the user and content to determine for each queued file whether it should be delivered or remain queued for later delivery.

Network policies, as described above, benefit both the administrator and the end user. Administrators can enforce network policies to help alleviate network usage during peak times (saving time and money), while end users benefit because they do not have to endure long wait times while the system attempts to install a large item.

According to one embodiment, the content management engine 20 utilizes a policy to constrain fulfillment to the device based on a best interpretation of cost and value. This policy enforces a delivery constraint during the reconcile event on matching certain conditions. In some embodiments, the constraint will be enacted on a per-item basis. The policy should be implemented for all items irrespective of the event that initiates the action-user self-installed, administrative push or policy. The network policy is triggered on reconcile or installation.

According to some embodiments, the network policy <trigger> is the detection of a reconcile using a GRPS or 1× connection. Once this <trigger> is identified, the policy can be invoked. According to other embodiments, the network policy <trigger> is the detection of WiFi or Cradle/LAN connections. When one of the above <trigger> is recognized the content management engine 20 may test for one or more of the following conditions: the content size; the content type; the item name; the time of day (so as to allow the administrators to constrain a reconcile or install event to a specific time of day); and the day of the week Where a user is self-installing an item but the network policy prevents fulfillment, this is likely to be interpreted as a system failure unless a message is returned. Thus, the network policy may generate a response from the content management system 10 (FIGS. 1-2) informing the user that that the item cannot be fulfilled at this time.

According to one embodiment, the content management system 10 provides an XML based declarative policy model 32 for specifying and editing content policies. The policy model includes a declarative language of the form "UPON <trigger> IF<condition> THEN <action>." The policy model further includes the ability to specify new policies in a XML representation that captures the system trigger specifying when the policy conditions should be evaluated, the policy conditions that must be TRUE in order for the policy to be applied, and the policy actions that are performed when the policy conditions evaluate to TRUE. The policy model further includes the ability to modify an existing policy via a web based User Interface by editing the trigger(s), condition(s), or action(s).

According to one embodiment, the content management system 10 includes a web based admin console 28 that enables a system administrator to review existing policies contained within a policy repository 14, modify the existing policies, create new policies, instantiate policies, disable policies, delete policies, archive policies, and import/export policies.

According to one embodiment, the admin console 28 can automatically generate policy wizards 36 that a system administrator can utilize to create and modify policies. Policy wizards 36 are defined in XML format based on an XML wizard definition language called the Policy Wizard Definition Language. The policy wizards 36 specify a sequence of steps that the system administrator must perform in a specific order, as well as the dependencies amongst steps (e.g., parameter X, in step Y, must be specified before parameter A in Step B can be specified). The admin console 28 provides the ability to present the policy wizard 36 to the end user either via an HTML page displayed in a browser or via an application that parses the XML representation of the Wizard.

According to one embodiment, the content management system 10 includes a high-performance policy retrieval and evaluation component for identifying, storing and retrieving policies from a policy repository 14. The policy repository implements an index to enable high performance retrieval using a tuple <TRIGGER, OPERATION, SUBJECT, OJBECT> such that each item in the tuple maps to a system action, a LDAP DN, or a wildcard (an item specifying that the specific value of the item is not required). The policy retrieval and evaluation component supports wild card parameters in the policy identification tuple if a particular parameter is irrelevant. A wild card parameter in a tuple is a "don't care" placeholder and will map to any parameter value. For example, an administrator might wish to use a wild card in a policy that fires when any user attempts to access the system or when any kind of device is used to access content. The policy repository 14 is able to translate any policy identification tuple into a LDAP DN that is used to index an individual policy, or a set of policies if wildcards are present. The policy repository can quickly retrieve all policies, based upon their LDAP DNs that are relevant to a particular system <trigger> and set of system <conditions>. The policy retrieval and evaluation component can statically optimize the retrieval of relevant policies by ordering the elements of the policy identification tuple to improve system performance related to the retrieval of policy objects. The policy retrieval and evaluation component can dynamically optimize the retrieval of relevant policies by building a LDAP search tree that indexes against any of the elements of the tuple with the appropriate delimiters.

According to one embodiment, the policy repository 14 is implemented as a standard LDAP object schema. The LDAP object schema includes, but is not limited to, a multi-valued condition object attribute, an ordered multi-valued action object attribute, and A set of miscellaneous object attributes. The multi-valued condition object attribute is configured such that each value of the objects maps to a single condition in a disjunction of policy conditions, and each object attribute value can be a well-formed LDAP string or a call to a system implemented method. The ordered multi-valued action object attribute is configured such that each value of the object maps to one action in a conjunction of policy actions, and each action is evaluated in order of appearance. The set of miscellaneous object attributes includes the common name of the policy, the owner of the policy, the description of the policy, the status of the policy, and the access rights associated with the policy.

According to one embodiment, the content management system 10 includes a LDAP accessible LDAP policy repository 14 for storing, and retrieving LDAP policy objects. The policy repository 14 includes a high performance, secure, fully distributed, LDAP based policy repository, and for the ability to distribute LDAP policy objects across multiple physical instances of LDAP directories.

According to one embodiment, the content management system 10 implements a system transaction processing component that is able to replace system status flags and pending system actions with transient policies (that are processed by the policy retrieval and evaluation component). System resources are locked by instantiating a transient "locked" policy when the system resource needs to locked and turning off or deleting the transient policy when the system no longer needs to be locked. "Check in/check out" version control on digital content is supported by instantiating transient "checked in" and "checked out" policies. If a piece of content must be "checked in and out" a system policy is created stating this effect. When a user "checks out" a piece of digital content that has a "checked in and out policy" associated with it from a content repository, a transient policy is instantiated stating who the user is (using their LDAP user profile DN) and what device they have the content on (using the device LDAP device profile DN). They also create another transient policy stating that the content cannot be accessed by anyone else (the locked policy). The policy is triggered on the "CHECK IN" action (e.g., when a piece of content is put back in the system). When the policy is evaluated it first disables itself, and then disables the locked policy so that some one else can check the content out.

According to one embodiment, the content management system 10 implements an event notification component based on defining event notifications as policies (processed by the policy retrieval and evaluation component) that trigger actions to invoke external systems (email, SMS, fax, etc.) to deliver notifications. The event notification system represents event notifications as simple event policies specifying the desired system trigger, conditions, and actions, and it can be flexibly extended by adding additional notification devices such as fax notification, e-mail notification, and voice notification, as policy actions.

According to one embodiment, the content management system 10 includes a distributed, highly efficient and scalable pass-through policy filter architecture for implementing policy decision points (PDPs) and policy enforcement points (PEP) that enables the detection and enforcement of the policies relevant to a any system transaction. The pass-through policy filter architecture ensures that no system transaction can bypass the PEP unless specifically configured by the system administrator. The pass-through policy filter architecture provides scalable PDP and PEP by instantiating multiple policy filters in parallel and load balancing the transactions across them. The pass-through policy filter architecture provides distributed PDP and PEP by instantiating policy filters in different locations improving system throughput and performance and security. The pass-through policy filter architecture also enables multiple policies to be applied to the same transaction at different locations such that each location is in a different security domain and administered by system administrators.

Examples of Policies

The policy "Send the group RnD an email notifying them of any new items in the Release Notes catalog" would be represented as:

tcocpolicy
        uniqueidentifier=123456789
        tcPolicyType=Catalog
        tcDisplayName=Release Note Catalog Update
        tcActivityState=ACTIVE
        tcPolicyEventType=WAREHOUSE_ITEM_ADDED
        tcOCPolicyActionDN=uniqueIdentifier=abcdefg,
        ou=Actions,ou=Policies,dc=mExperience
        tcPolicyCondition=com.truecontext.wasabi.business.
            catalog.Catalog.getCatalogID$=$tccatalo
        gname=Release Notes, ou=catalogs, dc=mExperience
        tcDisplayInfo=1, 2, 3, (based on UI requirements)
    tcocemailaction
        uniqueIdentifier=abcdefg
        tcCommand=com.truecontext.
            wasabi.business.misc.email.JMSMailHelper $ sendEmail $ tcrecipient $ tcsubkect $ tcpayload $ tcsender $ tcpriority
        tcPayload=A new item had been added to the $com.truecontext.wasabi.business.catalog.Catalog.getCatalogName$.
        tcPriority=Normal
        tcRecipientUserDN=
        tcRecipientGroupDN=cn=RnD, ou=Groups, dc=mExperience
        tcSenderDN=uid=tc_sysop, ou=People, dc=mExperience
    tcSubject=A new item has been added a a catalog.

While the present invention has been described with reference to one or more particular embodiments, those skilled in the art will recognize that many changes may be made thereto without departing from the spirit and scope of the present invention. Each of these embodiments and obvious variations thereof is contemplated as falling within the scope of the claimed invention, which is set forth in the following claims.

What is claimed is:

1. A shared, mobile content management system comprising:
    a computer including a processor and a memory;
    a declarative mobile policy model for specifying and editing content policies stored on the memory, the declarative mobile policy model including a declarative language of the form UPON <trigger> IF <condition> THEN <action>; the IF <condition> including events, context or state information relating to an operation of a mobile device;
    a policy wizard having a plurality of steps, each of the steps including user prompts and user options to accept selections by a user to create a new policy without coding written by a user, the policy wizard run on the processor for specifying policies, each of which are based on the selections of the user options that includes,
    (a) a system <trigger> specifying when at least one <condition> should be evaluated,
    (b) that the at least one <condition> must be true in order for the policy to be applied, and
    (c) at least one policy that must be performed in response to determining that the at least one policy <condition> evaluates to true; and
    a content management engine run on the processor adapted to evaluate the policies specified by the policy wizard.

2. The content management system of claim 1 further comprising, a policy repository for storing the policies specified by the policy wizard, the policy repository including an interface for allowing the content management engine to retrieve the stored policies.

3. The content management system of claim 1, wherein the content management engine includes a plurality of filters adapted to select relevant policies to apply.

4. The content management system of claim 3, wherein at least two of the plurality of filters are connected in parallel to each other.

5. The content management system of claim 3, wherein at least two of the plurality of filters are connected in serial with each other.

6. The content management system of claim 4, wherein the content management engine includes a systems transaction processor for evaluating relevant policies selected by the plurality of filters.

7. The content management system of claim 1, wherein an existing policy is modified via a web based user interface by editing the <trigger>, at least one <condition>, and the at least one <action>.

8. A mobile content management system comprising:
a computer including a processor and a memory;
a policy repository in the memory for storing a plurality of mobile policy definition files therein, the policy definition files being written in a mobile policy wizard definition language; and
an admin console controlled by the processor for automatically generating policy wizard user interfaces based on selected ones of the mobile policy definition files, the admin console being adapted to specify the policy wizard user interfaces in XML as a sequence of steps that must be performed in a certain order, the policy wizard user interfaces guiding a user through the sequence of steps via prompts, each step including a user selected option to accept user selections without XML coding input written by the user to create a mobile policy,
wherein the admin console selects the mobile policy definition files based on mapping local and distributed LDAP DNs, system defined triggers, external mobile triggers detected from a mobile device, systems actions, external actions based on mobile device operation, system conditions, and external conditions based on mobile device context and wherein the admin console states natural language expressions for presentation via the generated policy wizard user interfaces.

9. The content management system of claim 8, wherein the policy definition files specify different user options for each of the steps in the sequence and how the sequence of steps should be presented by the admin console in response to generating the policy wizard user interface.

10. The content management system of claim 8, wherein the generated policy wizard user interface is presented to the user via an HTML page.

11. The content management system of claim 8, wherein the generated policy wizard user interface is presented to the user via an application that parses the XML representation of the policy definition file.

12. The content management system of claim 8, wherein the user is guided through the sequence of steps in order to modify an existing policy, the modification being to a specific part of the policy, such as one or more of the following,
   (a) the triggers,
   (b) the conditions, and
   (c) the actions.

13. The content management system of claim 8, wherein the admin console automatically generates a natural language representation of the policy in the form a sentence within the policy wizard user interface.

14. The content management system of claim 13, wherein the admin console is able to highlight a portion of the natural language representation of the policy that is being modified.

15. A non-transitory machine-readable storage medium including instructions executable by a machine, which when executed cause a processor to identify, store and retrieve policies using policy classification tuples having policy classification attributes including <TRIGGER, OPERATION, SUBJECT, OBJECT> attributes, the instructions comprising:
   identification instructions for retrieving only policy objects from a policy repository that are relevant to a particular mobile content management system request by matching the <TRIGGER> policy classification attribute of the policy object to an event that initiated the request and by matching any of the <OPERATION>, <SUBJECT> or <OBJECT> policy classification attributes of the policy object to a current context of a mobile device making the request;
   extension instructions supporting a wild card parameter within the policy identification tuples, the wild card parameter matching any value for that element in response to retrieving the tuple; and
   static optimization instructions of policy retrieval by ordering the elements of the policy identification tuples.

16. The non-transitory machine-readable storage medium of claim 15, wherein the policy classification tuples are translated into a LDAP DN that is used to index one or more policy object.

17. The non-transitory machine-readable storage medium of claim 16, wherein a set of policy objects are matched in response to determining that a wild card parameter is within the policy classification tuple.

18. The non-transitory machine-readable storage medium of claim 16, wherein the policy objects are retrieved based on their LDAP DNs that are relevant to the particular content management system and the one or more content management system.

19. The non-transitory machine-readable storage medium of claim 18 further comprising, an algorithm for dynamic optimization of policy retrieval by building an LDAP search tree that indexes against any of the elements of the tuple with appropriate delimiters.

20. The non-transitory machine-readable storage medium of claim 16, wherein the policy objects are represented using an LDAP object schema specific to mobile content management systems, the representation captures a conditional declarative specification of the policy in the form UPON <trigger>, IF <condition> THEN <action>.

21. The non-transitory machine-readable storage medium of claim 20, wherein the <action> is only performed if the <condition> statement logically evaluates to TRUE, when the content management system <trigger> exists.

22. The non-transitory machine-readable storage medium of claim 20, wherein the <action> is a conjunction of system actions to be performed by a system transactions processor, and the <condition> is a disjunction of system condition expressions that are evaluated to be true or false when evaluated by one or more policy filters.

23. The non-transitory machine-readable storage medium of claim 20, wherein the LDAP policy schema includes,
   (a)
   a multi-valued condition object attribute such that each value of the object maps to a single condition in a disjunction of policy conditions, and each object attribute value is a well-formed LDAP string or a call to a system implemented method,
   (b)
   an ordered multi-valued action object attribute such that each value of the object maps to one action in a conjunction of policy actions, and each action is evaluated in order of appearance, and
   (c)
   a set of miscellaneous object attributes including a common name of the policy, an owner of the policy, a description of the policy, a status of the policy, and an access rights associated with the policy.

24. The non-transitory machine-readable storage medium of claim 20, wherein the policy repository is a high performance, secure, fully distributed, LDAP based policy repository, and the high-performance algorithm distributes LDAP policy objects across multiple physical instances of LDAP directories.

* * * * *